United States Patent
Romanyszyn (10) Patent No.: US 7,175,164 B2
(45) Date of Patent: Feb. 13, 2007

(54) METHOD AND APPARATUS FOR AN OVAL CARBONATOR

(75) Inventor: Adrian M Romanyszyn, San Antonio, TX (US)

(73) Assignee: Lancer Partnership, Ltd, Sam Antonio, TX (US)

( * ) Notice: Subject to any disclaimer, the term of this patent is extended or adjusted under 35 U.S.C. 154(b) by 0 days.

(21) Appl. No.: 10/777,930

(22) Filed: Feb. 12, 2004

(65) Prior Publication Data

US 2005/0179147 A1 Aug. 18, 2005

(51) Int. Cl.
*B01F 3/04* (2006.01)

(52) U.S. Cl. ............... 261/112.1; 261/115; 261/119.1; 261/DIG. 7; 99/323.1; 426/477

(58) Field of Classification Search ............... 261/115, 261/117, 118, 119.1, 112.1, 123, 121.1, 122.1, 261/DIG. 7; 99/323.1, 323.2; 426/474, 426/477
See application file for complete search history.

(56) References Cited

U.S. PATENT DOCUMENTS

| | | | |
|---|---|---|---|
| 681,526 A * | 8/1901 | Young | 261/69.1 |
| 780,714 A * | 1/1905 | Ferry | 261/76 |
| 1,052,599 A * | 2/1913 | Lichter et al. | 261/4 |
| 1,232,694 A * | 7/1917 | Kruecke | 261/115 |
| 2,195,449 A * | 4/1940 | Delen | 261/157 |
| 2,235,244 A * | 3/1941 | Ames et al. | 62/225 |
| 2,306,714 A * | 12/1942 | Rowell | 261/153 |
| 2,339,640 A * | 1/1944 | Holinger | 261/27 |
| 3,441,176 A * | 4/1969 | Reynolds et al. | 222/640 |
| 4,093,681 A * | 6/1978 | Castillo et al. | 261/122.1 |
| 5,190,189 A * | 3/1993 | Zimmer et al. | 222/67 |
| 5,524,452 A | 6/1996 | Hassell et al. | 62/389 |
| 5,851,445 A * | 12/1998 | Kazuma | 261/103 |
| 6,574,981 B2 | 6/2003 | Schroeder | 60/306 |
| 6,626,005 B2 | 9/2003 | Schroeder | 62/306 |
| 6,767,009 B2 * | 7/2004 | Ziesel | 261/115 |

* cited by examiner

*Primary Examiner*—Scott Bushey
(74) *Attorney, Agent, or Firm*—Christopher L. Makay (57) ABSTRACT

A method and corresponding apparatus for an oval carbonator employ an oblong housing to provide an improved gas/water interaction area within the confines of the carbonator. The increased cross sectional area provides a larger water surface area, whereby an increased amount of the pressurized gas is exposed to the increased surface area. Further advantages of the oval carbonator include a simplification of the tubing bundles that are cast into the cold plate. The oval carbonator consolidates the volumes previously used by the carbonator, thereby allowing the tubing bundles to be consolidated. Consolidation of this type translates into reduced manufacturing time and increased savings due to the simplified design.

6 Claims, 7 Drawing Sheets

METHOD AND APPARATUS FOR AN OVAL CARBONATOR

BACKGROUND OF THE INVENTION

1. Field of the Invention

The present invention relates to beverage dispensing and, more particularly, but not by way of limitation, to methods and apparatus for beverage dispensing with cold carbonation.

2. Description of the Related Art

In the post-mix beverage dispensing industry, carbonated beverages account for the largest segment of the different beverage types. Unfortunately, carbonation of a beverage can dramatically affect the quality of a finished drink. Proper carbonation must be achieved in order to consistently produce quality drinks, including minimal foaming.

Over the past decades, it has been determined that colder temperatures in the carbonation process produce better carbonation efficiencies and can be accomplished at lower carbon dioxide pressures. As such, the carbonation methods used to carbonate finished drinks have moved from ambient carbonators to various forms of chilled carbonators. A further deviation from this trend includes using prechilled water in carbonators to further reduce the temperatures in the carbonation process.

Current trends include casting the carbonators directly into a cold plate of a beverage dispenser. Cast-in-place carbonators operate at reduced temperatures due to the decreased temperature of the cold plate, thereby increasing absorption of the gas in the carbonator.

While cast-in-place carbonators provide increased efficiencies, it is often a struggle to maximize the size of the carbonator, without increasing the size of the cold plate. Further complications arise when the multitude of pre-formed dispensing tubes located in the cold plate must be adjusted to provide clearance for the integral carbonator. Attempts have been made to reduce the height of the carbonator, but have resulted in complex designs that are difficult to manufacture.

Accordingly, an improved cast-in-place carbonator design that would increase carbonator efficiencies, provide for simplified dispense tubing designs, and a decreased cold plate thickness would be beneficial to beverage dispensing manufacturers.

SUMMARY OF THE INVENTION

In accordance with the present invention, an oval carbonator provides a decreased height and an increased exterior surface area for carbonators. The decreased height reduces the amount of material required in a cold plate, while the increased exterior surface area provides additional heat removal capability. The oval shape further provides an increased liquid/gas interaction area. The oval carbonator further consolidates carbonator components into a single location, therein simplifying tubing runs in an associated cold plate, and reducing manufacturing costs.

The invention further includes a film generator assembly for increasing the surface area of a liquid stream for interaction with a gas. A corresponding method increases the amount of liquid surface area present in the carbonator. The film generator assembly further isolates the incoming liquid and the turbulence associated with the incoming liquid to provide an improved level sensing capability.

It is therefore an object of the present invention to provide a carbonator with an oblong shell for a decreased carbonator height.

It is a further object of the present invention to provide an increased exterior surface area for additional heat removal capability.

It is still further an object of the present invention to provide an increased liquid/gas interaction area in the carbonator for increased carbonator efficiencies.

It is still yet further an object of the present invention to provide a film generator assembly to increase the surface area of an incoming liquid stream in the carbonator.

It is still yet further an object of the present invention to provide a method for increasing the surface area of a liquid.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. It is further to be understood that the figures are not necessarily to scale, and some features may be exaggerated to show details of particular components or steps.

An oval carbonator minimizes the height required in a cold plate and increases the gas/water interaction area in the carbonator as compared to commonly used circular carbonator designs. The oval carbonator further includes a film generator assembly that more efficiently diffuses the incoming water, thereby promoting increased surface area exposure for interaction with gas in the carbonator. The oval carbonator includes a probe that may be used with a controller to ascertain whether the carbonator requires refilling. The oval carbonator is designed to be used in a cold plate of a beverage dispenser to carbonate water for beverage drinks. Use of the oval carbonator further simplifies the routing of beverage and diluent tubing runs in the cold plate due to its compact design.

Figure 1:
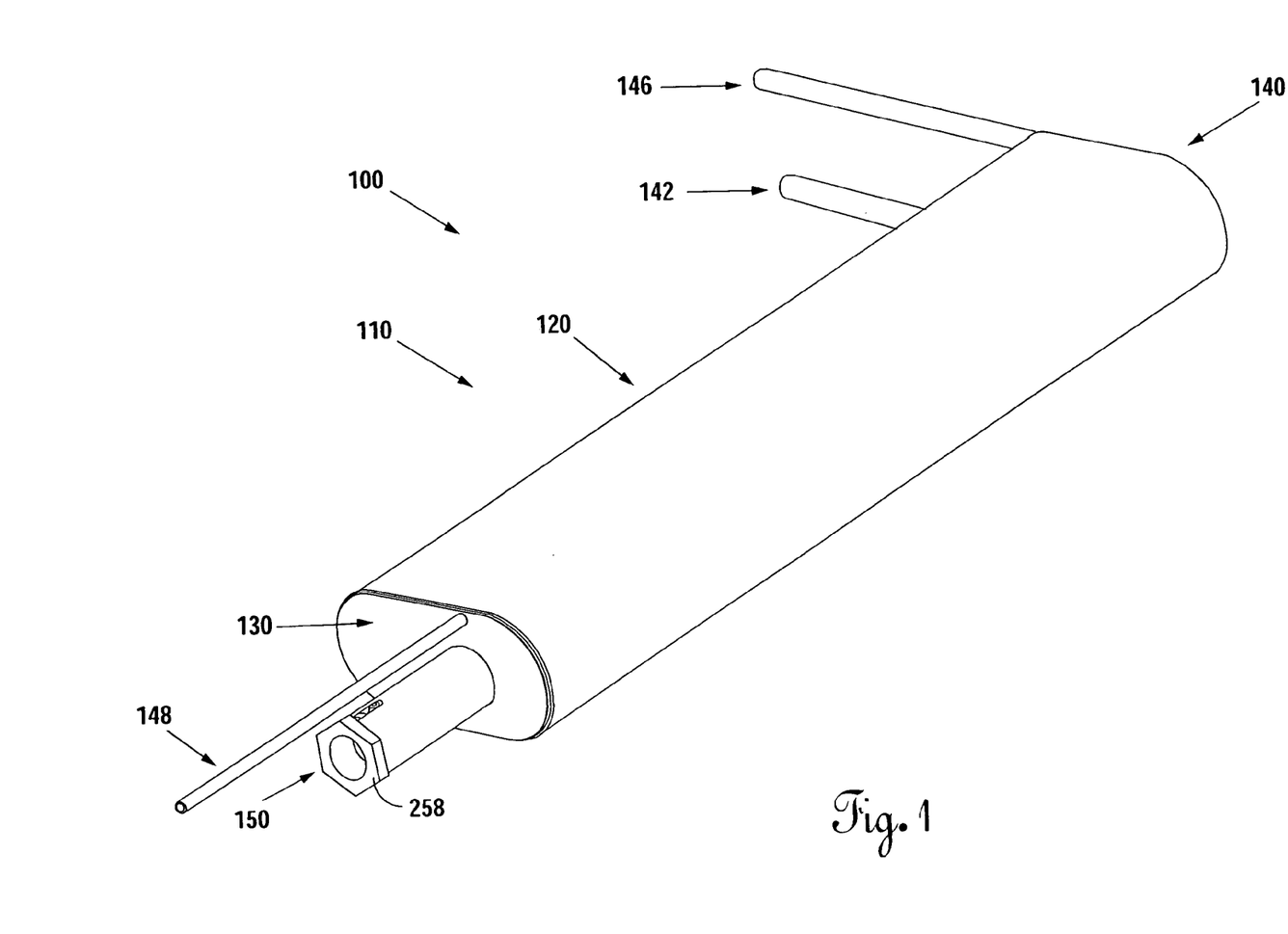
FIG. 1 provides a perspective view of an oval carbonator according to the preferred embodiment.
Figure 2:
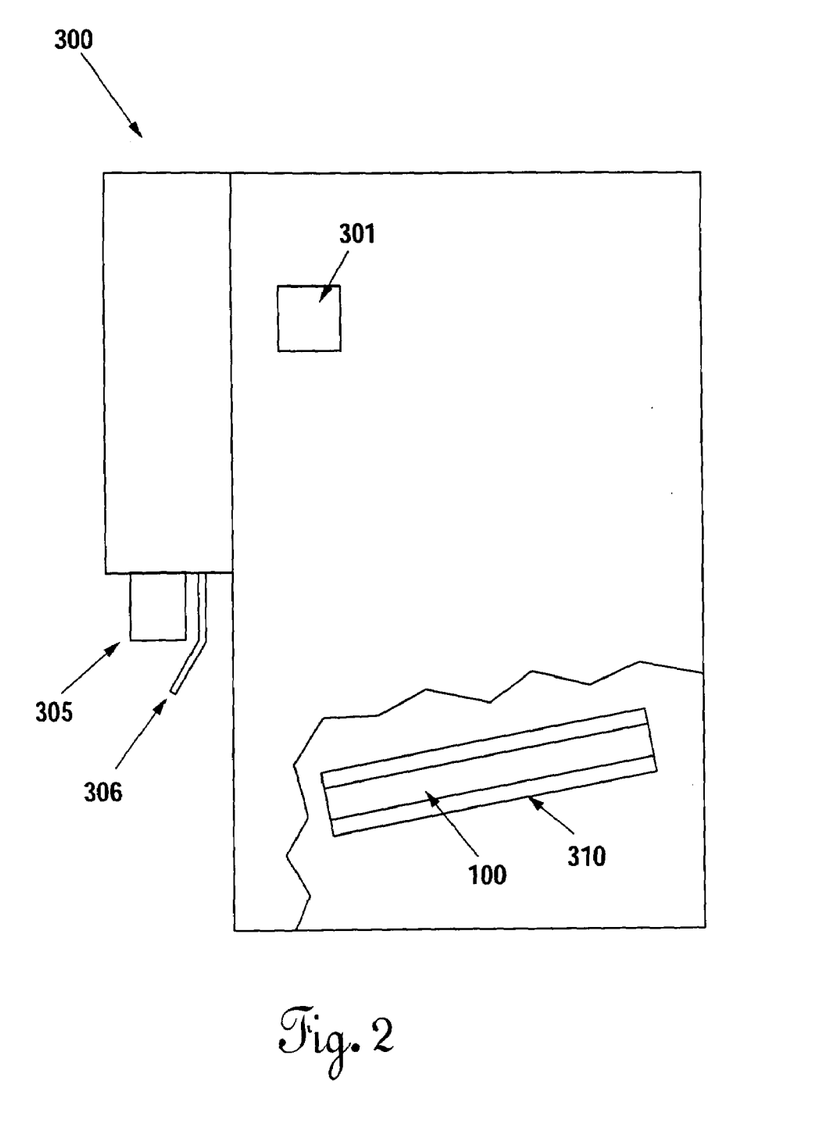
FIG. 2 illustrates a beverage dispenser including a cold plate and an integral oval carbonator according to the preferred embodiment.
Figure 3:
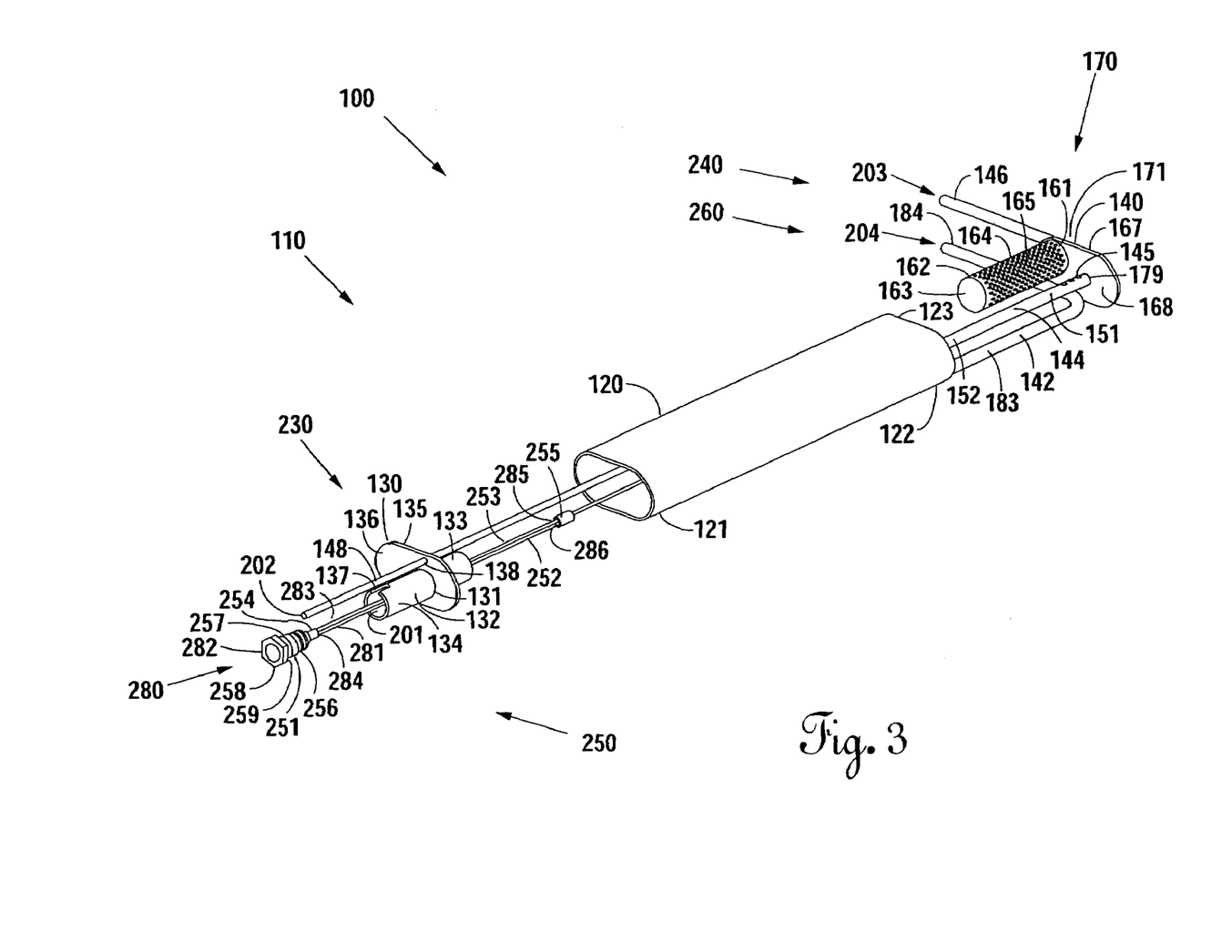
FIG. 3 provides an exploded view of the oval carbonator according to the preferred embodiment.
Figure 3A:
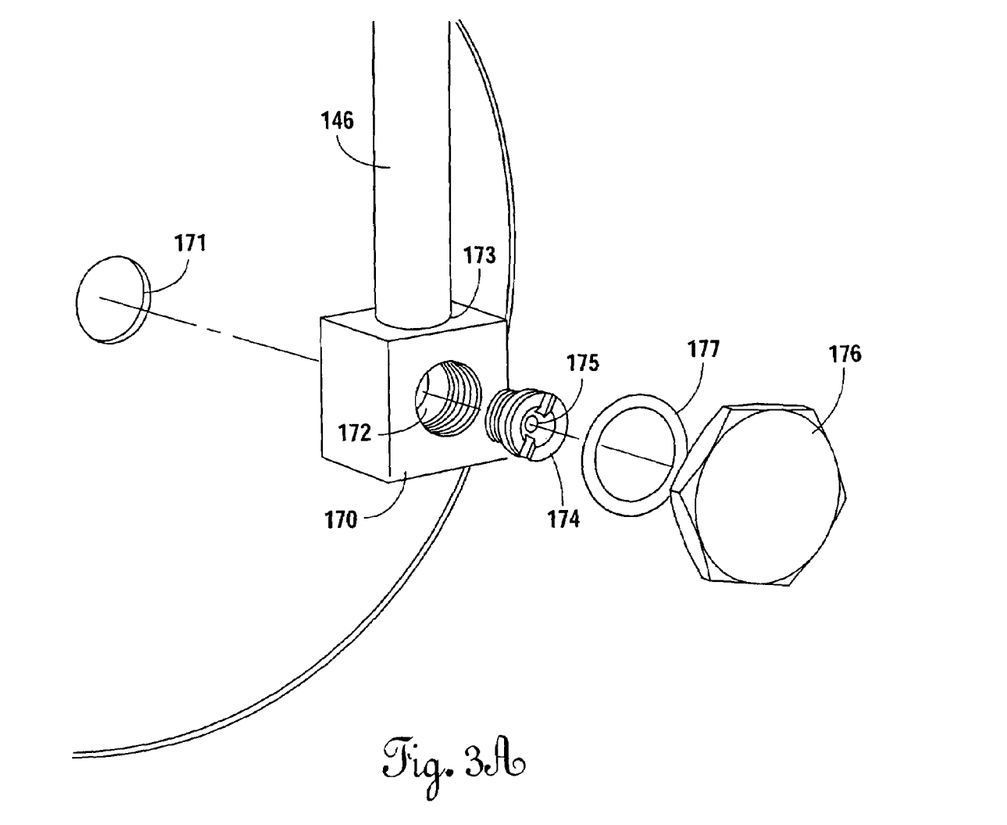
FIG. 3a provides an exploded view of the orifice housing components according to the preferred embodiment.
Figure 4:
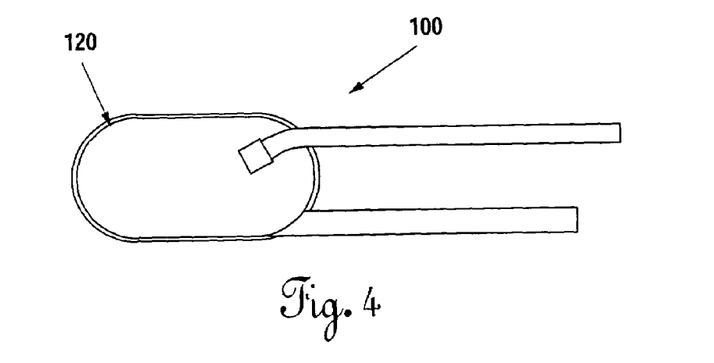
FIG. 4 illustrates an end view of the oval carbonator according to the preferred embodiment.

As shown in FIGS. 1–6, an oval carbonator 100 may be integrally cast into a cold plate 310, wherein the cold plate 310 is used to provide cooling to items in contact with the cold plate 310, including beverage dispensing lines, diluent lines and the integral oval carbonator 100. Once cooled, beverage drinks may be dispensed through a beverage dispensing nozzle 305 when an activator 306 is operated. The oval carbonator 100 includes a housing 110, a probe assembly 250, and a film generator assembly 260. The housing 110 includes a shell 120, a front plate 130 and a back plate 140. The shell 120, having a first end 121 and a second end 122, is of a hollow oblong cross section as shown in FIG. 4. The first end 121 and the second end 122 are cut perpendicular to the axis of the shell 120 for simplicity, but could otherwise be at any preselected angle. The second end 122 of the shell 120 includes an exit port 123 to allow a carbonated water pickup tube 142 to pass through the shell 120 during assembly. The front plate 130 and the back plate 140 are of a shape complementary to the openings of the shell 120, and are suitably mounted to the shell 120 to contain an interior volume of the shell 120. In most cases, the front plate 130 and the back plate 140 are welded to the shell 120 when outfitted.

The front plate 130 includes a first side 135, a second side 136, a gas inlet port 138, and a probe aperture 131. The probe aperture 131 is of a size suitable to accept an outer diameter of a probe fitting 132. A front plate assembly 230 includes the front plate 130, the probe fitting 132, and a gas inlet tube 148. A first end 133 of the probe fitting 132 is inserted into the probe aperture 131 of the front plate 130 to a predetermined distance, substantially such that half of the probe fitting 132 is disposed into the aperture 131. The probe fitting 132 must be suitably connected to the front plate 130, preferably through a welding process. The second end 134 of the probe fitting 132 further includes a slot 137 for aligning the probe assembly 250. The first end 133 is in alignment with the first side 135 of the front plate 130. The gas inlet port 138 is of a size sufficient to accept the gas line 148. The gas line 148, in communication with a gas source (not shown), passes through the front plate 130 to enter the housing 110 to deliver gas to the oval carbonator 100. This connection must also be suitably sealed to allow the carbonator 100 to hold liquids and gases.

A back plate assembly 240 includes the back plate 140, the film generator assembly 260, a probe guide 144, an orifice housing 170, and a water inlet tube 146. The back plate 140 includes a first side 167, a second side 168, a liquid inlet port 171, and a depression 179. The liquid inlet port 171 is of a size sufficient to not impede water entering the housing 110 from a water inlet tube 146 and the orifice housing 170. The orifice housing 170 is of the same form as disclosed in U.S. patent application Ser. No. 10/677,854, filed on Oct. 2, 2003, the disclosure of which is hereby incorporated by reference. The orifice housing 170 includes a first aperture 172, a second aperture 173 leading to the first aperture 172, and a fitting 174 that may be removable for cleaning or carbonator 100 tuning situations. The first aperture 172 of the orifice housing 170 is aligned with the liquid inlet port 171 of the back plate 140. The second aperture 173 is coupled to the water inlet pipe 146, such that water to be carbonated passes from the water inlet tube 146 through the second aperture 173, into the first aperture 172, through an orifice 175 in the fitting 174 and through the liquid inlet port 171 to enter the housing 110. The orifice housing 170 requires a plug 176 and an o-ring 177 at the exposed end of the first aperture 172 to seal the interior chamber of the carbonator 100.

Figure 5:
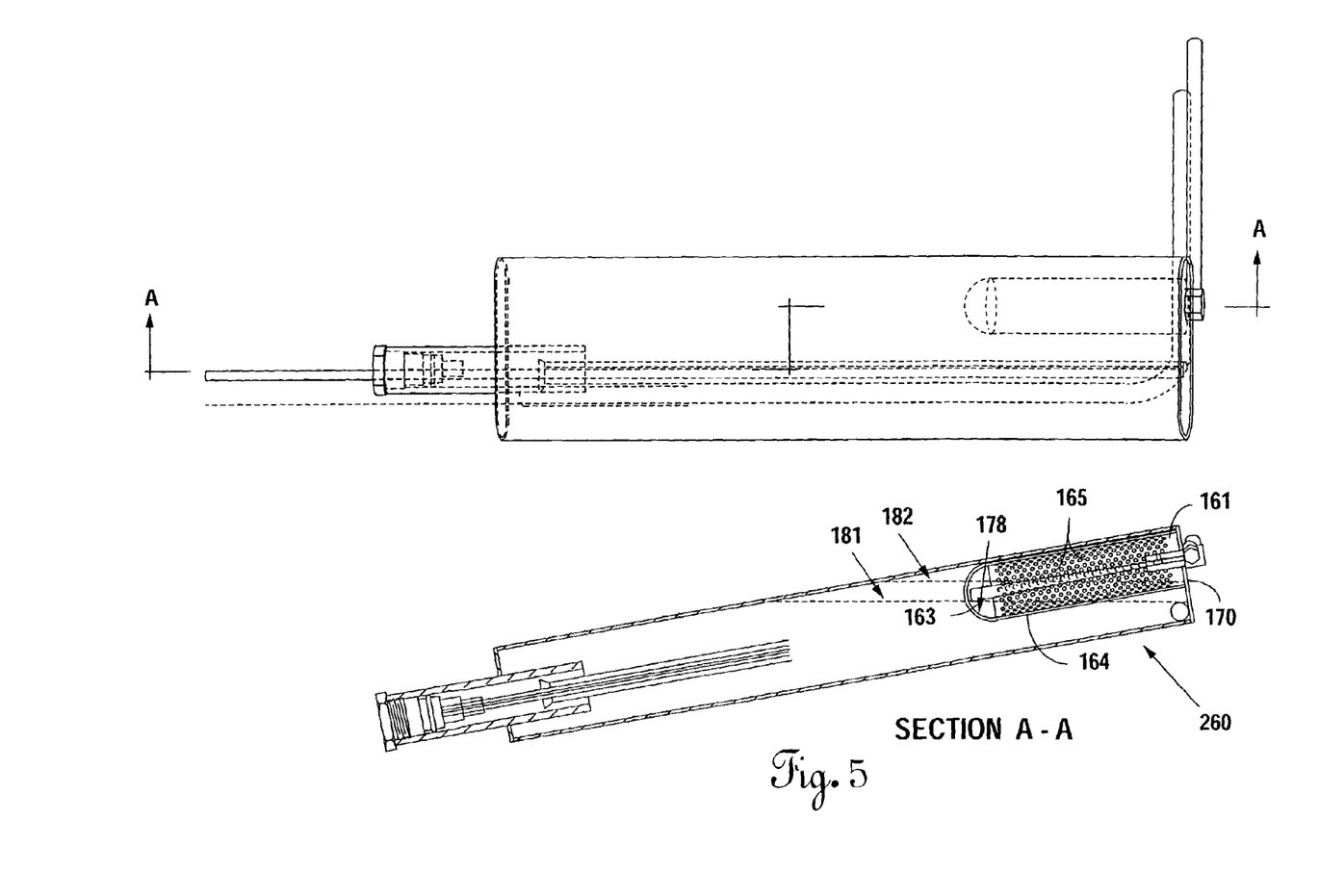
FIG. 5 provides a cross section view of a film generator assembly according to the preferred embodiment.

The film generator assembly 260 includes a hemispherical redirector 163, and a cylindrical film generator 164. The film generator 164 includes a first end 161 and a second end 162. The first end 161 is coupled to the second side 168 of the back plate 140, whereby the cylindrical shape of the film generator 164 is concentric to the liquid inlet port 171. As previously disclosed, the redirector 163 is hemispherical in shape, and of a diameter substantially equal to the diameter of the film generator 164, such that the exposed diameter may be coupled to the second end 162 of the film generator 164. Coupling of the film generator 164 and the hemispherical redirector 163 may be accomplished through welding. The film generator 164 further includes multiple apertures 165 used to aid in the filming process.

The depression 179 is of a size sufficient to accommodate a first end 151 of the probe guide 144, thereby providing locating aid during assembly. As such, the probe guide 144 may be repeatedly located on the backplate 140 and attached to the backplate 140 using any suitable process, for example, welding. The probe guide 144 further includes evacuation holes 145 near the first end 151 to prevent gas from being trapped in the probe guide 144.

The probe assembly 250 includes a probe housing 251, a primary probe 252, a secondary probe 253, a first insulator 254, a second insulator 255, o-rings 256 and a protrusion 257. The probe housing 251 includes a central aperture 280 that passes through the probe housing 251 from a first end 281 to a second end 282. The first insulator 254 is disposed in the central aperture 280 of the probe housing 251. The first insulator 254 includes a primary aperture 283 and a secondary aperture 284. The primary probe 252 is of shape sufficient to be housed in the primary aperture 283 in the first insulator 254. The secondary probe 253 is likewise of sufficient diameter to be housed in the secondary aperture 284 of the first insulator 254. The second insulator 255 also includes a primary aperture 285 and a secondary aperture 286, wherein the primary probe 252 and the secondary probe 253 similarly pass through the primary aperture 285 and the secondary aperture 286 of the second insulator 255, respectively. The insulators 254 and 255 provide a mechanism to separate and restrain the probes. The second insulator 255 includes an outer diameter that mirrors the inner diameter of the probe guide 144. As such, the second insulator 255 slides into the probe guide 144 to center the probes 252 and 253.

The probe housing 251 includes features to accept the o-rings 256 and provide proper sealing. The protrusion 257 is of a size sufficient to slide into the slot 137 of the probe fitting 132 when the probe assembly 250 is located in the probe fitting 132, further providing a mechanical stop for the probe assembly 250. A probe nut 258 includes threads 259 to secure the probe nut 258 in the probe fitting 132, thereby restraining the probe assembly 250 in the confines of the probe fitting 132.

Upon assembly, the first end 133 of the probe fitting 132 is inserted into the first end 121 of the shell 120 and the front plate 130 is welded to the shell 120 to create a portion of a vessel. A first end 183 of the carbonated water pickup tube 142 is then placed into the inner portion of the shell 120, such that a second end 184 protrudes from the exit port 123 located on the second end 122 of the shell 120. The back plate assembly 240 may now be aligned with the shell 120 to insert a second end 152 of the guide tube 144 into the second end 122 of the shell 120. The back plate assembly 240 must be inserted such that the guide tube 144 is in alignment with the probe fitting 132 mounted in the first end 121 of the shell 120. Once inserted, the back plate assembly 240 may be welded to the shell 120 to further enclose the housing 110. The welding operations include sealing all mating seams, thereby creating a vessel that will hold pressure. At this point, openings remaining in the vessel include an inner passage 201 of the probe fitting 132, a passage 202 through the gas inlet tube 148, a water inlet passage 203 in the water inlet tube 146, and carbonated water passage 204 through the carbonated water pickup tube 142.

Once the welding of the housing 110 is complete, the probe assembly 250 is installed into the inner passage 201 of the probe fitting 132. An exposed end of the primary probe 252 is inserted into the guide tube 144, and the probe assembly 250 is further pushed into the inner passage 201 of the probe fitting 132. As the probe housing 251 enters the probe fitting 132, the o-rings 256 engage an inner diameter of the probe fitting 132 to create a seal. The protrusion 257 of the probe housing 251 then enters the slot 137 in the probe fitting 132, thereby locating the probe assembly 250 in the passage 201. The probe nut 258 is then installed in the inner passage 201 of the probe fitting 132 to secure the probe assembly 250.

In use, the carbonator 100 is disposed in a cold plate 310. In this preferred embodiment, the cold plate 310 is disposed within a beverage dispenser 300 at an angle of substantially ten degrees. The carbonator 100, being substantially parallel with the cold plate 310, is similarly inclined at substantially ten degrees, with the front plate 130 of the housing 110 nearest a lowest end of the cold plate 310. The cross section of the oval carbonator 100, in combination with the slant of ten degrees provides a substantially increased fluid/gas interface area.

The oblong shell 120 of the carbonator 100 also increases the exterior surface area of the carbonator 100, thereby increasing the heat removal capability over the commonly used round cross section shells. The oblong shell 120 further provides for a reduced vertical profile in the cold plate 310. The reduced vertical height of the oval carbonator 100 reduces the height requirement for the cold plate 310, thereby minimizing the thickness of the cold plate 310 and the quantity of aluminum required in a cold plate 310. While this preferred embodiment has been shown with an oblong shell 120, it should be clear to one skilled in the art that the shape of the shell does not have to be a perfect oblong. An oval or semi-oblong shape may be suitable to provide a decreased vertical height in a cold plate 310.

In most instances, the dispenser 300 includes a controller 301 to conduct dispensing operations, including the operations of the probe assembly 250 in the carbonator 100. The controller 301 is connectable to the primary probe 252 and the secondary probe 253 to take resistive measurements between the probes and a common ground. Each resistive measurement is representative of a liquid or a gas. The controller 301 then utilizes the information to determine whether the carbonator 100 requires filling, as well as when the carbonator 100 is full.

In operation, the gas inlet tube 148 is coupled to a gas regulator (not shown) and ultimately, a gas source (not shown). The water inlet tube 146 is coupled to a boost pump (not shown) and ultimately, a water source (not shown). The carbonated water pickup tube 142 is coupled to delivery tubes that lead to the beverage dispensing nozzle 305 for mixing with beverage syrup. The gas source and the gas regulator provide gas to the housing 110 at a pressure of seventy to eighty pounds per square inch. The gas enters the housing 110 through the gas inlet pipe 148 and occupies the area above any existing water level in the housing 110. The water source delivers water to be carbonated to the water inlet tube 146. The water to be carbonated moves from the inner passage 203 of the water inlet tube 146 into the first aperture 172 of the orifice housing 170, and through the orifice 175 in the removable fitting 174 to enter the liquid inlet port 171 of the back plate 140. The water entering from the water inlet tube 146 is pressurized to one hundred twenty five to one hundred fifty pounds per square inch by a boost pump (not shown). The pressurized water passing through the orifice 175 in the removable fitting 174 creates a water jet as it enters the housing 110.

As shown in FIG. 5, the jet stream is unobstructed until it contacts an inner surface 178 of the hemispherical film generator assembly 260. The jet stream contacts the inner surface 178 of the hemispherical redirector 163 and is forced to flow along the inner surface 178 of the hemispherical redirector 163 towards the film generator 164. The film generator 164 includes a plurality of apertures 165 to force the fluid into a film, thereby increasing the exposed surface area of the fluid. The increased surface allows more gas to be absorbed into the liquid. Additional benefits of this type of film generator assembly 260 include the separation of the jet stream, as well as any disruptions in the fluid due to the high pressure jet stream, from the carbonator probes 252 and 253. Separation of this type minimizes the possibility of erratic readings due to turbulent fluids in the carbonator 100 and better level sensing.

As shown in FIG. 5, the carbonator 100 includes a Low Level line 181 and a High Level line 182. When the carbonator 100 is initially started, the carbonator 100 is pressurized to seventy to eighty pounds per square inch through the gas inlet tube 148. Water at approximately one hundred twenty five to one hundred fifty pounds per square inch is let into the carbonator 100 through the water inlet tube 146, into the orifice housing 170 and through the orifice 175 in the removable fitting 174 to enter the carbonator 100. As previously disclosed, the water enters in a jet stream and contacts the film generator assembly 260, therein creating a film as the fluid momentum forces the water to follow the inner surface 178 of the hemispherical redirector 163 and the cylindrical film generator 164. When the momentum of the fluid has been exhausted, the fluid moves downward over the cylindrical film generator 164, and becomes part of the carbonated water supply pool.

Figure 5A:
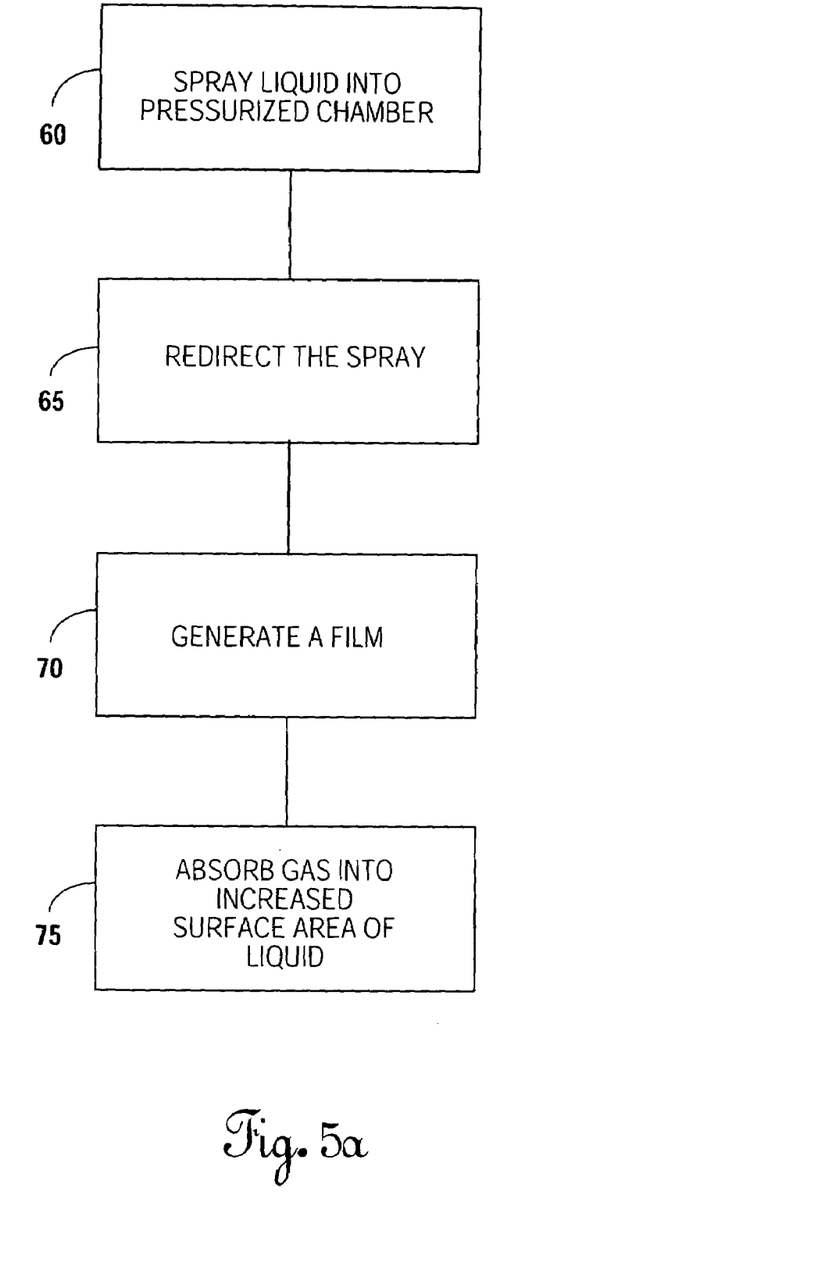
FIG. 5a is a method flowchart for increasing the surface area of a fluid according to the preferred embodiment.

FIG. 5*a* provides a method flowchart for increasing the surface area of a liquid. Increased surface area in a liquid provides for an increased gas/liquid interaction area. The process begins with step 60, wherein a liquid is sprayed into a chamber containing a pressurized gas. Once the liquid is sprayed into the chamber, it is redirected through the use of a hemispherical redirector 163 as shown in step 65. The hemispherical redirector 163 forces the liquid to flow along an inner surface 178 towards the cylindrical film generator 164. As the fluid flows along the surface of the cylindrical film generator 164, it turns into a film as it passes over the apertures 165 in the cylindrical film generator 164 as shown in step 70. The pressurized gas is absorbed by the liquid at all exposed liquid surface areas, step 75. The amount of gas absorbed by the fluid is directly related to the readily available liquid/gas interface, the decreased fluid temperature, as well as all exposed surface areas due to filming and sprays. The liquid/gas mixture is then stored for use.

As the water enters the pressurized carbonator 100, gas is absorbed into the water, thereby creating carbonated water. After passing through the film generator assembly 260, the carbonated water pools in the lower portion of the carbonator 100, to await removal through the carbonated water pickup tube 142 and delivery to a dispensing nozzle 305.

The carbonator 100 continues to be filled until the water level in the carbonator 100 reaches the high level line 182. Once the high level line 182 is reached, the controller 301 ceases providing power to the carbonator pump motor. In this state, the carbonator 100 will remain pressurized, however, as carbonated drinks are dispensed, the carbonated water level decreases. When the carbonated water level falls below the low level line 181, the controller 301 commences to provide power to the carbonator pump motor to refill the carbonator 100 to the high level line 182.

Figure 6:
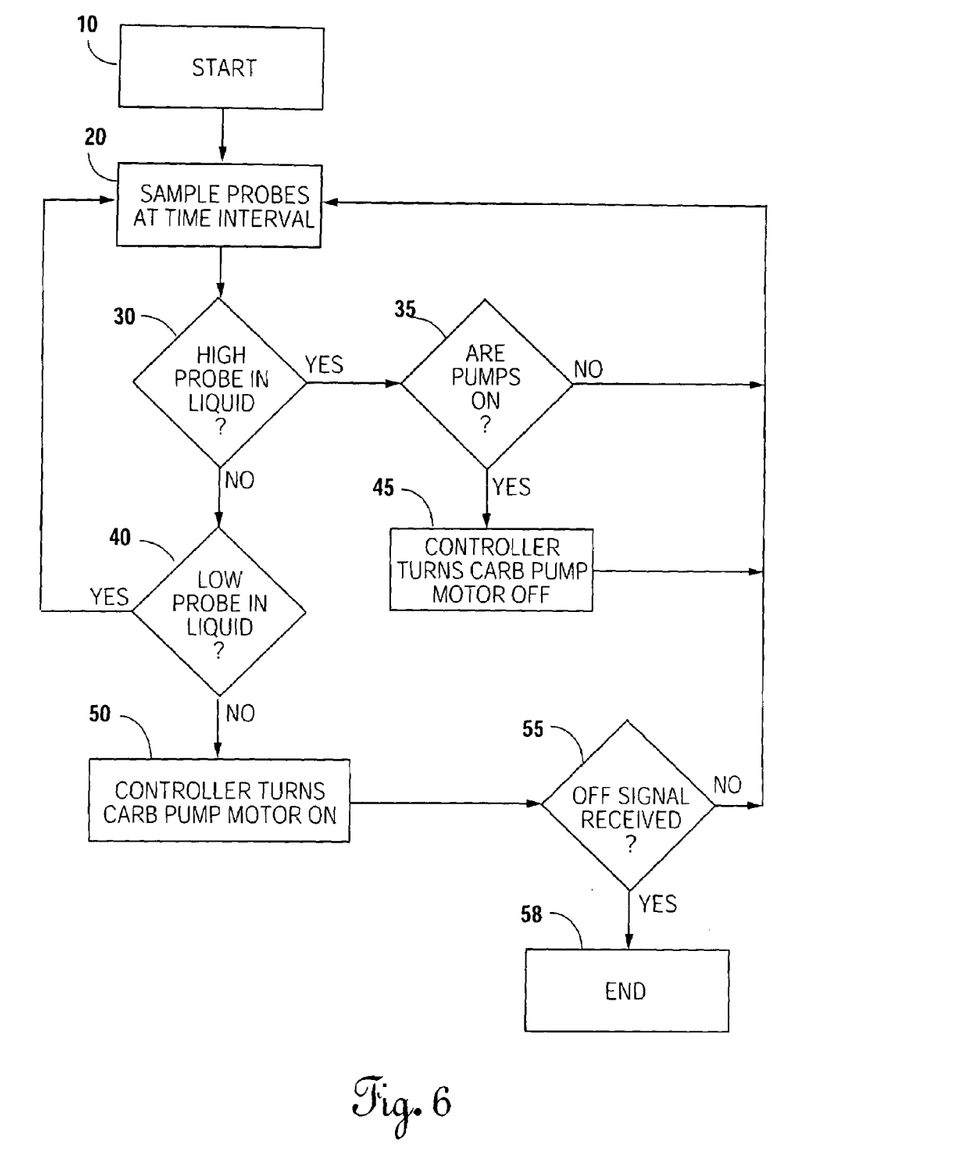
FIG. 6 is a method flowchart showing the operation of refilling the carbonator according to the preferred embodiment.

FIG. 6 provides a method flowchart for the carbonator probe operations. The process commences with step 10, the start position. Once the process is started, the controller 301 moves to step 20, wherein the controller 301 commences to monitor the primary and secondary probes 252 and 253 at a predetermined interval, every one tenth of a second in this preferred embodiment. The process then moves to step 30, wherein the controller 301 determines whether the primary probe 252 reading is representative of a liquid. If the reading is not representative of a liquid, the process moves to step 40, wherein the controller 301 determines if the secondary probe 253 reading is representative of a liquid. If the reading in step 40 is representative of a liquid, the controller returns to step 20 to continue sampling. If the reading in step 40 is not representative of a liquid, the controller 301 provides power to the carbonator pump motor to refill the carbonator 100.

If the reading in step 30 is representative of a liquid, the process moves to step 35, wherein the controller 301 determines if the carbonator pump motor is on. If the carbonator pump motor is not on in step 35, the controller 301 returns to step 20 to continue the sampling of the probes. If the carbonator pump motor is on in step 35, the process moves to step 45, wherein the controller 301 turns the carbonator pump motor off. The controller 301 then returns to step 20 to continue sampling.

After turning the carbonator pump motor on in step 50, the process moves to step 55, wherein the controller 301 determines if an off signal has been received. If an off signal has been received in step 55, the controller 301 moves to step 58, the end. If an off signal has not been received in step 55, the process returns to step 20, wherein the controller 301 continues to sample the probes.

In summary, the oblong shell 120 provides an improved gas/water interaction area within the confines of the carbonator 100. The increased cross sectional area provides a larger water surface area, whereby an increased amount of the pressurized gas is exposed to the increased surface area. Further advantages of the oval carbonator 100 include a simplification of the tubing bundles that are cast into the cold plate 310. The oval carbonator 100 consolidates the volumes previously used by the carbonator, thereby allowing the tubing bundles to be consolidated. Consolidation of this type translates into reduced manufacturing time and increased savings due to the simplified design.

Although the present invention has been described in terms of the foregoing preferred embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

I claim:

1. A carbonator, comprising:
    a housing;
    a film generator assembly disposed in the housing, the film generator assembly including a hemispherical redirector coupled to a cylindrical film generator, wherein the hemispherical redirector includes an inner surface, and further wherein the cylindrical film generator includes apertures to aid a liquid in taking the shape of a film;
    a gas inlet port disposed on the housing, the gas inlet port coupled with a gas source for communicating gas into the housing;
    a liquid inlet port disposed on the housing, the liquid inlet port coupled with a liquid source for communicating liquid onto the inner surface of the hemispherical redirector, wherein the liquid contacts the inner surface and is redirected onto the cylindrical film generator, thereby forcing the liquid to film as the liquid moves down the cylindrical film generator, thereby maximizing the liquid/gas interaction area; and
    an outlet port disposed on the housing for delivery of a liquid/gas mixture exterior to the housing.

2. The carbonator according to 1, wherein the gas is carbon dioxide.

3. The carbonator according to 1, wherein the liquid is water.

4. The carbonator according to 1, wherein the mixture exiting the carbonator is carbonated water.

5. A method of increasing the surface area of a liquid for mixing with a gas, comprising:
    a. placing a film generator assembly in a chamber filled with a pressurized gas, wherein the film generator assembly comprises a hemispherical redirector coupled with a cylindrical film generator including apertures;
    b. spraying the liquid onto an inner surface of a hemispherical redirector;
    c. redirecting the sprayed liquid towards the cylindrical film generator;
    d. generating a film as the liquid moves over the cylindrical film generator; and
    e. passing the film over the apertures to aid film generation.

6. The method according to 5, further comprising:
    f. absorbing the higher pressure gas into an increased exposed surface area of the liquid.

* * * * *